United States Patent [19]

Kuwata et al.

[11] Patent Number: 4,995,043

[45] Date of Patent: Feb. 19, 1991

[54] THIN-FILM ELECTROLUMINESCENCE APPARATUS INCLUDING OPTICAL INTERFERENCE FILTER

[75] Inventors: Jun Kuwata, Katano; Atsushi Abe, Ikoma, both of Japan

[73] Assignee: Matsushita Electric Industrial Co., Ltd., Osaka, Japan

[21] Appl. No.: 471,967

[22] Filed: Jan. 29, 1990

[30] Foreign Application Priority Data

Mar. 24, 1989 [JP] Japan ........................ 1-072422

[51] Int. Cl.[5] ........................ H01S 3/30

[52] U.S. Cl. ........................ 372/7; 372/39; 372/45; 313/503

[58] Field of Search ........................ 378/45, 7; 372/39; 313/112, 503, 509

[56] References Cited

U.S. PATENT DOCUMENTS

| | | | |
|---|---|---|---|
| 3,573,653 | 4/1971 | Smiley | 372/7 |
| 3,579,142 | 5/1971 | Smiley | 372/7 |
| 3,854,070 | 12/1974 | Viasenko et al. | 313/503 |
| 3,868,589 | 2/1975 | Wang | 372/7 |
| 4,002,998 | 1/1977 | Conwell et al. | 372/7 |

*Primary Examiner*—Léon Scott, Jr.

*Attorney, Agent, or Firm*—Stevens, Davis, Miller & Mosher

[57] ABSTRACT

An electroluminescence apparatus in which voltage is applied to a lamination of a fluorescent material layer and a dielectric layer through a pair of electrodes one of which is light-transmissible to extract fluorescence. A reflecting mirror layer is provided on the lamination while a particular relationship is established between the refractive index and the thickness of the lamination, thereby improving the efficiency with which the fluorescence is extracted.

7 Claims, 16 Drawing Sheets

CHANGE IN TRANSISSIVITY WITH CHANGES IN DISTANCE L BETWEEN REFLECTING SURFACES OR INCIDENT ANGLE θ
K: WAVELENGTH, D: TRANSMISSIVITY

THIN-FILM ELECTROLUMINESCENCE APPARATUS INCLUDING OPTICAL INTERFERENCE FILTER

BACKGROUND OF THE INVENTION

This invention relates to thin-film electroluminescence apparatus and, more particularly, to a thin-film electroluminescence apparatus suitable for thin-film flat displays for use with information terminal of office automation systems.

A display based on a thin-film electroluminescence (hereinafter referred to simply as "thin-film EL') apparatus has been proposed which has a construction described below. FIG. 1 shows a structure in which a dielectric layers 4 and 6 are provided on two sides of a fluorescent material layer 5, and these layers are interposed between a transparent electrode 2 and a back electrode 7. Thin-film EL displays in which ZnS: Tb, F for green luminescence or ZnS: Mn for orange luminescence is used for the fluorescent material layer 5 are known. In all cases, emitted light is extracted through a glass surface on one side of the layers where the transparent electrode is provided, and the intensity of light thereby extracted is at most about 10% of that of the light emitted from the emission center of the fluorescent material layer.

This cause is based on the Fresnel's law, that is 90% or more of the light emitted from the emission center of the fluorescent material layer is reflected by the interface between the fluorescent material layer and the dielectric layer or between the latter and the transparent electrode. This is because the angle of total reflection to the emission wavelength is considerably small, that is, it is about 25°.

On the other hand, a method is known in which a Fabry-Perot interferometer is used for selecting the wavelength of light emitted from a light source having a wide range of emission wavelength. The Fabry-Perot interferometer allows transmission of light only when the light satisfies the following optical interference condition:

$$L \cdot q = K \cdot \pi (\pi\text{: circular constant})$$

where L represents the distance between a pair of reflecting mirrors 8 disposed parallel to each other as shown in FIGS. *2a* and *2b*, q represents the number of waves between the reflecting mirrors, and K is a positive integer. It has been actually found that as the reflectivity R of the reflecting mirrors is increased, the half width of the spectrum of light becomes narrower, as shown in FIGS. *3a* and *3b*. This phenomenon is described on pages 51 to 56 of Laser Physics Nyumon (Introduction to Laser Physics) written by Khoichi Shimota (published on Apr. 22, 1983 by Iwanami Shoten).

It is also known that this interferometer can be used as a laser resonator if a laser medium is inserted in the interferometer.

A thin film interposed between repetition multilayer films (multilayer-film optical interference filter) has a structure such as that shown in FIG. 4. It has been revealed that the interference characteristics of a thin film having this type of structure including reflecting layers formed on two sides of the film and having a high reflectivity ensure the same effects as the Fabry-Perot interferometer, as shown in FIG. 5. This type of thin film is formed by laminating optical thin films having different refractive indexes while setting the film thicknesses so as to satisfy the conditions for prevention of reflection with respect to the emission wavelength λ, that is, $(n \cdot d = (\frac{1}{4} + m/2) \cdot \lambda$ where n represents the refractive index, d represents the film thickness, and m=0, 1, 2 . . . ). Explanations relating to this thin film are found on pages 30 to 34 and 98 to 129 of Optical Thin Film edited by Shiro Fujiwara (published on Feb., 25, 1985 by Kyoritsu Shuppan).

The thin-film EL apparatus shown in FIG. 1 has an advantage in being easily manufactured, and thin-film EL displays based o this apparatus have been put to practical use. However, colors of these displays are limited to orange based on the use of ZnS: Mn for the fluorescent material layer and green based on the use of ZnS: Tb. To manufacture a thin-film EL display capable of displaying three elementary colors, materials for the fluorescent material layer are required which enable emission of light having red and blue emission colors with a high emission efficiency, but fluorescent layer materials have been not yet developed for realization of a practical display. Further it has been very important to improve the emission efficiency.

SUMMARY OF THE INVENTION

The present invention is devised in view of the above-mentioned problems sticking to the prior art electroluminescent apparatus, and accordingly, a main object of the present invention is to provide a thin-film electroluminescence apparatus which can produce bright light of three elementary colors with a high degree of luminescent efficiency.

To the end according to the present invention, there is provided a thin-film electroluminescence apparatus comprising a fluorescent material layer for emitting light having a wavelength of λ; a dielectric material layer laid on at least one side of the fluorescent material layer, the fluorescent material layer and the dielectric material layer forming, in combination, a laminated structure body having a film thickness of d; electrode layers at least one of which is light-transmissible for applying a voltage to said laminated structure body; and reflector layers having reflectivities of R1, R2 with respect to the light having the wavelength of λ and laid on both sides of said fluorescent material layer or the laminated structure body; the fluorescent material layer or said laminated structure body having a refractive index n which has the following relationship with respect to the film thickness d of the laminated body:

$$d = K \cdot n^{-1} \lambda / 2$$

where K is a positive integer equal to or greater than one.

With this arrangement, a means which has the same function of a Fabry-Perot interferometer can be provided in the thin-film EL apparatus, and light spontaneously emitted from the fluorescent material layer can be extracted while the direction of transmission is uniformly set to a direction perpendicular to the thin film surface by this interferometer. Light which is emitted from the emission center in the fluorescent material layer and which has a desired wavelength can therefore be extracted through the display surface at an improved efficiency. It is thereby possible to obtain three elementary colors, red, blue and green, with an emission efficiency ten times higher than that attained by the conventional apparatus.

According to the present invention, in its second aspect, there is provided a thin-film electro-laminated luminescence apparatus including an optical interference filter, comprising: a light-transmissible electrode layer; a light reflecting electrode layer; a fluorescent material layer or a laminated structure of a fluorescent material layer and a dielectric material layer, a voltage being applied to the fluorescent material layer or the laminated structure through the electrode layers; and a multilayer-film optical interference filter means capable of selectively transmitting light emitted from the fluorescent material layer and having an arbitrary wavelength $\lambda$, the optical interference filter being provided on a light extraction side of the fluorescent material layer or the laminated structure, the optical interference filter being formed of at least one first dielectric film having a smaller refractive index and at least one second dielectric film having a larger refractive index, the first and second dielectric films being alternately laminated based on an equation $\lambda/4$=film thickness x refractive index in the order of the second dielectric film and the first dielectric film, the fluorescent material layer or the laminated structure being formed by laminating a fluorescent material layer having a refractive index larger than that of the first dielectric film based on an equation $\lambda/2N$=film thickness x refractive index (where N is an integer equal to or larger than 1, and successively laminating a third dielectric film based on an equation $\lambda/4\times$positive integer=film thickness x refractive index.

In this construction, a means which has the same function of a Fabry-Perot interferometer is provided in the thin-film EL apparatus, and light spontaneously emitted from the fluorescent material layer can be extracted while the direction of transmission is uniformly set with respect to an emission wavelength selected as desired. Light which is emitted from the emission center in the fluorescent material layer and which has a desired wavelength can therefore be extracted through the display surface at an improved efficiency, thereby obtaining three elementary colors, red, blue and green, with an emission efficiency ten times higher than that attained by the conventional apparatus. The structure of the multilayer-film optical interference filter thus restricted makes it possible to effectively apply an electric field to the fluorescent material layer.

According to the present invention, in its third aspect, there is provided a thin-film electroluminescence apparatus comprising: a pair of electrode layers at least one of which is light-transmissible; a fluorescent material layer or a laminated structure of a fluorescent material layer and a dielectric material layer, a voltage being applied to the fluorescent material layer or the laminated structure through the pair of electrode layers; and a multilayer-film optical interference filter capable of selectively transmitting light emitted from the fluorescent material layer and having an arbitrary wavelength, the optical interference filter being provided on a light extraction side of the fluorescent material layer or the laminated structure. There is also provided a thin-film electroluminescence apparatus comprising: a pair of electrode layers at least one of which is light-transmissible; and a fluorescent material layer or a laminated structure of a fluorescent material layer and a dielectric material layer, a voltage being applied to the fluorescent material layer or the laminated structure through the pair of electrode layers, the fluorescent material layer and the laminated structure of fluorescent and dielectric material layers constituting a multilayer-film optical interference filter capable of selectively transmitting light emitted from the fluorescent material layer and having an arbitrary wavelength. Alternatively, the arrangement may be such that multilayer-film optical interference filters for allowing transmission of light of different wavelengths are provided on transparent electrodes on two sides of the EL apparatus to obtain different luminescence colors.

With this construction, a means which has the same function of a Fabry-Perot interferometer can be provided in the thin-film EL apparatus, and light spontaneously emitted from the fluorescent material layer can be extracted while the direction of transmission is uniformly set with respect to an emission wavelength selected as desired. Light which is emitted from the emission center in the fluorescent material layer and which has a desired wavelength can therefore be extracted through the display surface at an improved efficiency, thereby obtaining three elementary colors, red, blue and green with an emission efficiency ten times higher than that attained by the conventional apparatus. The use of the multilayer-film optical interference filter serving as a reflecting mirror enables a reduction in attenuation of extracted light and, hence, an improvement in extraction efficiency as compared with the apparatus in which metallic thin films are used. It is also possible to extract light having different wavelengths through the respective extraction surfaces.

Figure 1:
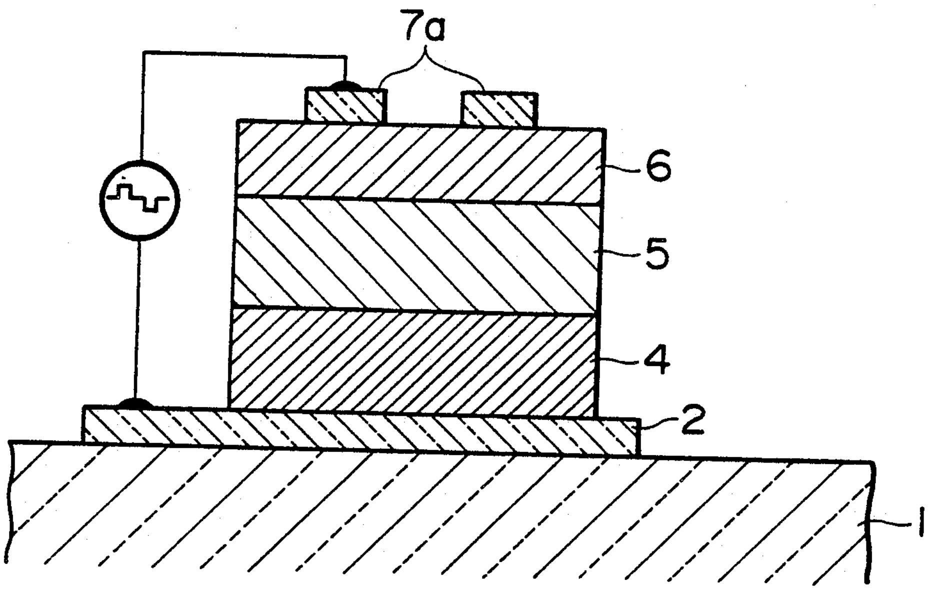
FIG. 1 PRIOR ART
FIG. 1 is a cross-sectional view of the structure of a conventional thin-film EL apparatus.
Figure 2A:
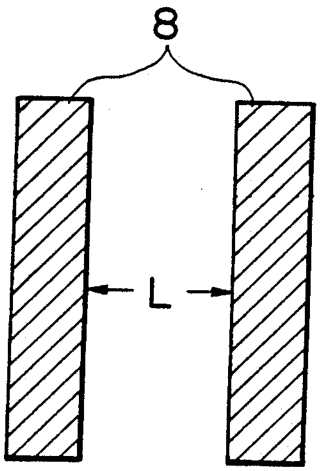
FIG. 2A PRIOR ART
Figure 2B:
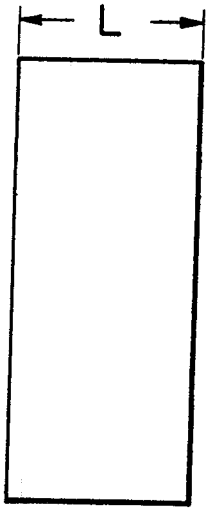
FIG. 2B PRIOR ART
Figure 3A:
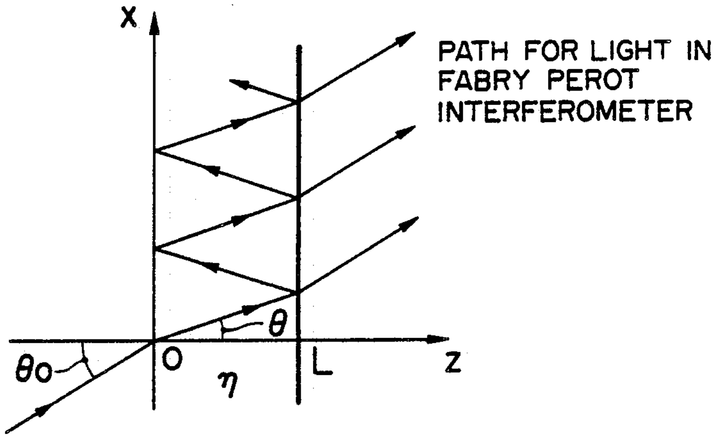
FIG. 3A PRIOR ART
Figure 3B:
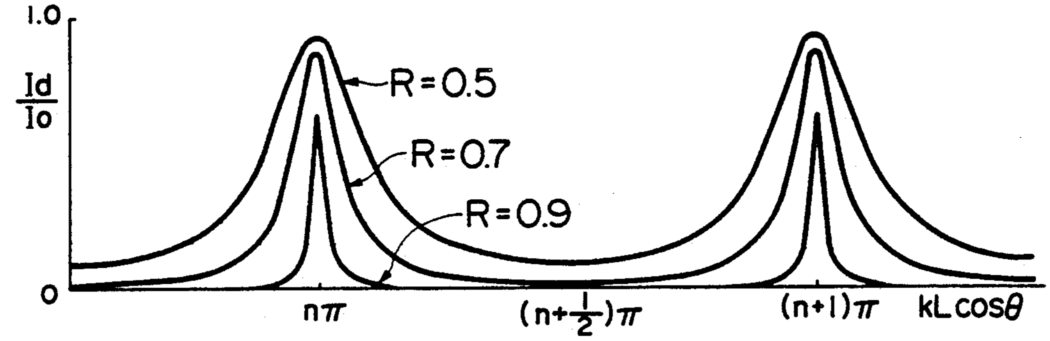
FIG. 3B PRIOR ART
Figure 4:
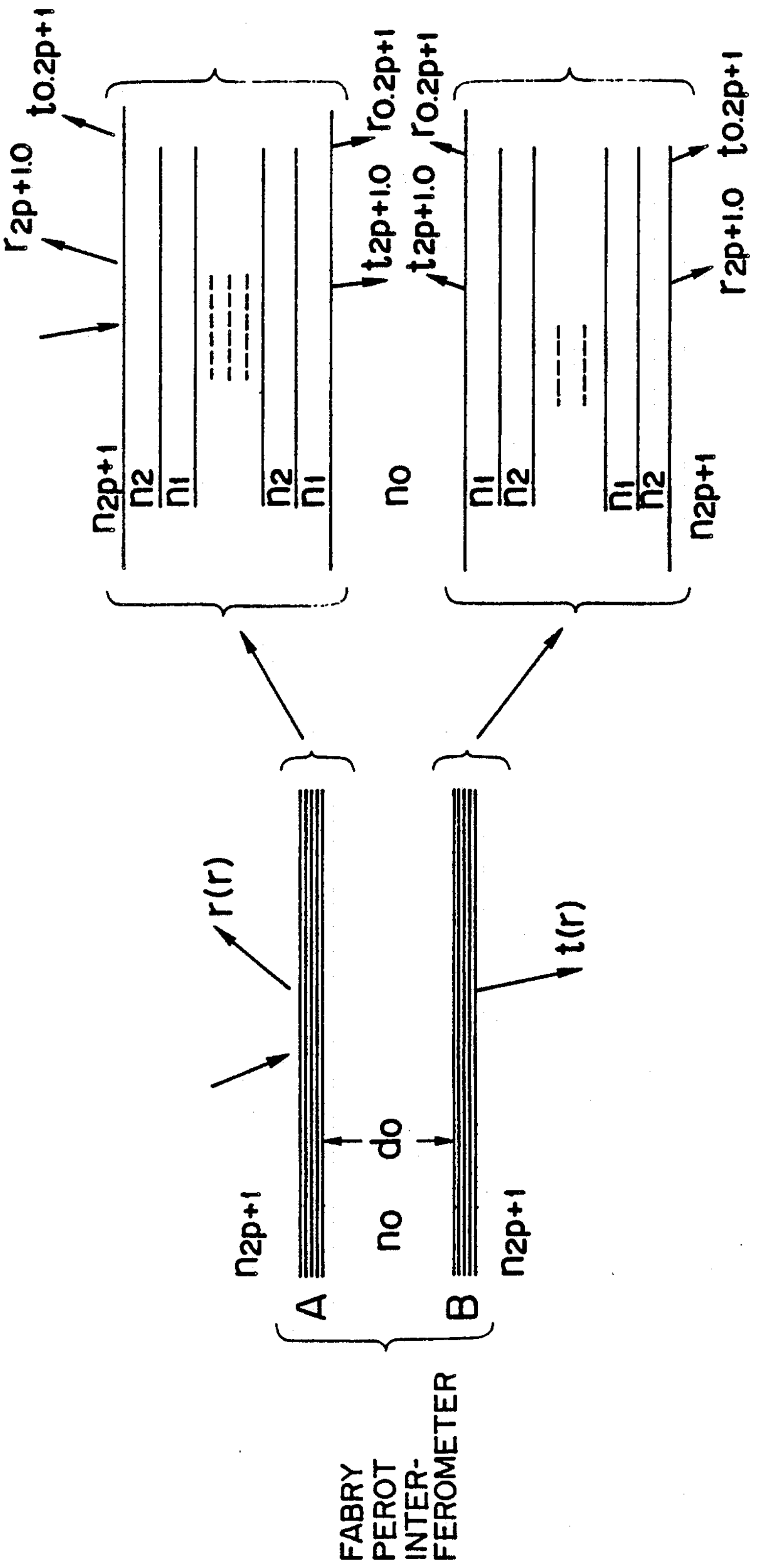
FIG. 4 PRIOR ART
Figure 5:
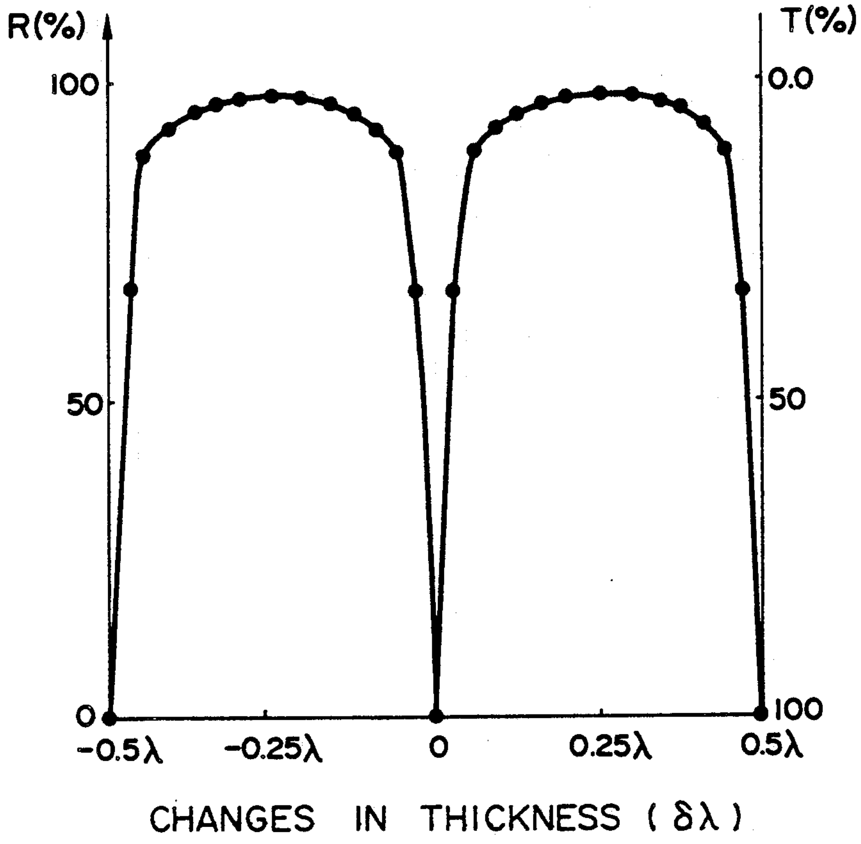
FIG. 5 PRIOR ART
Figure 6:
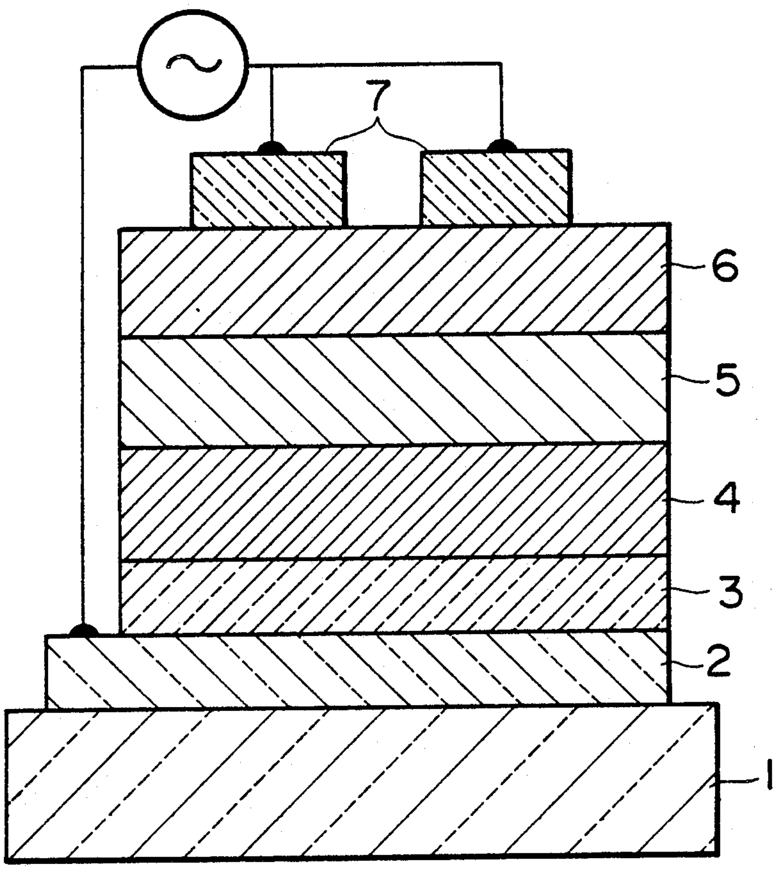
Figure 7:
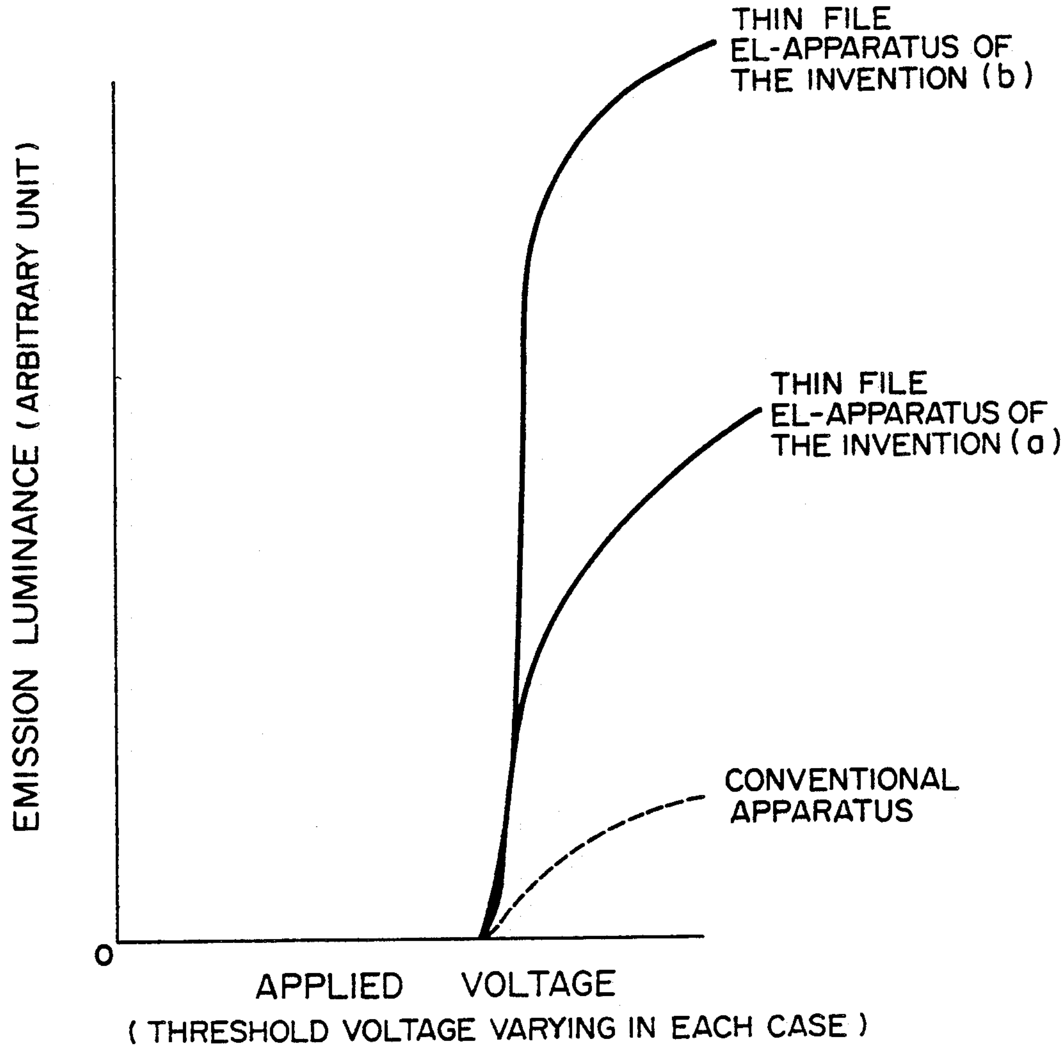
Figure 13:
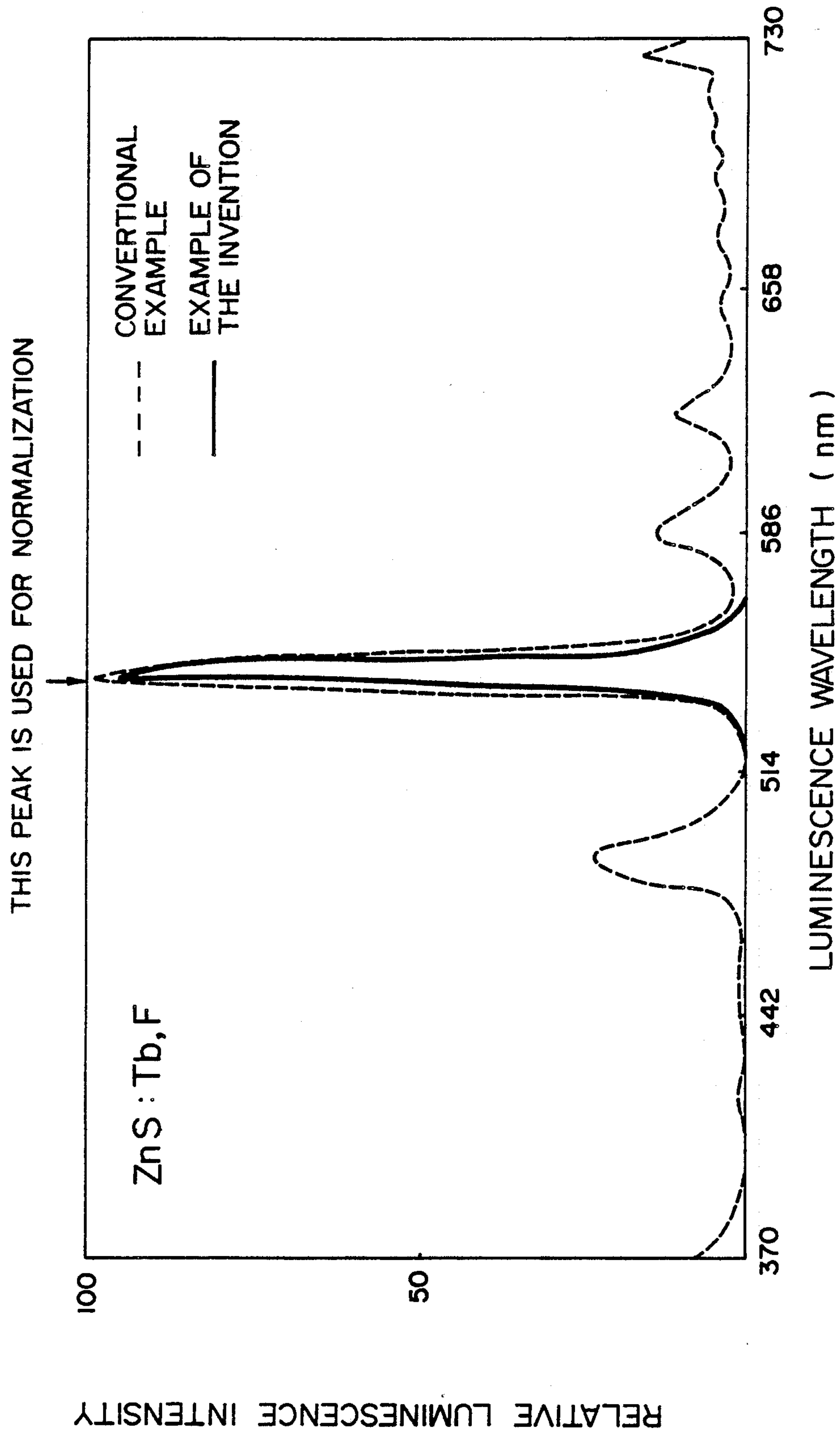
Figure 14:
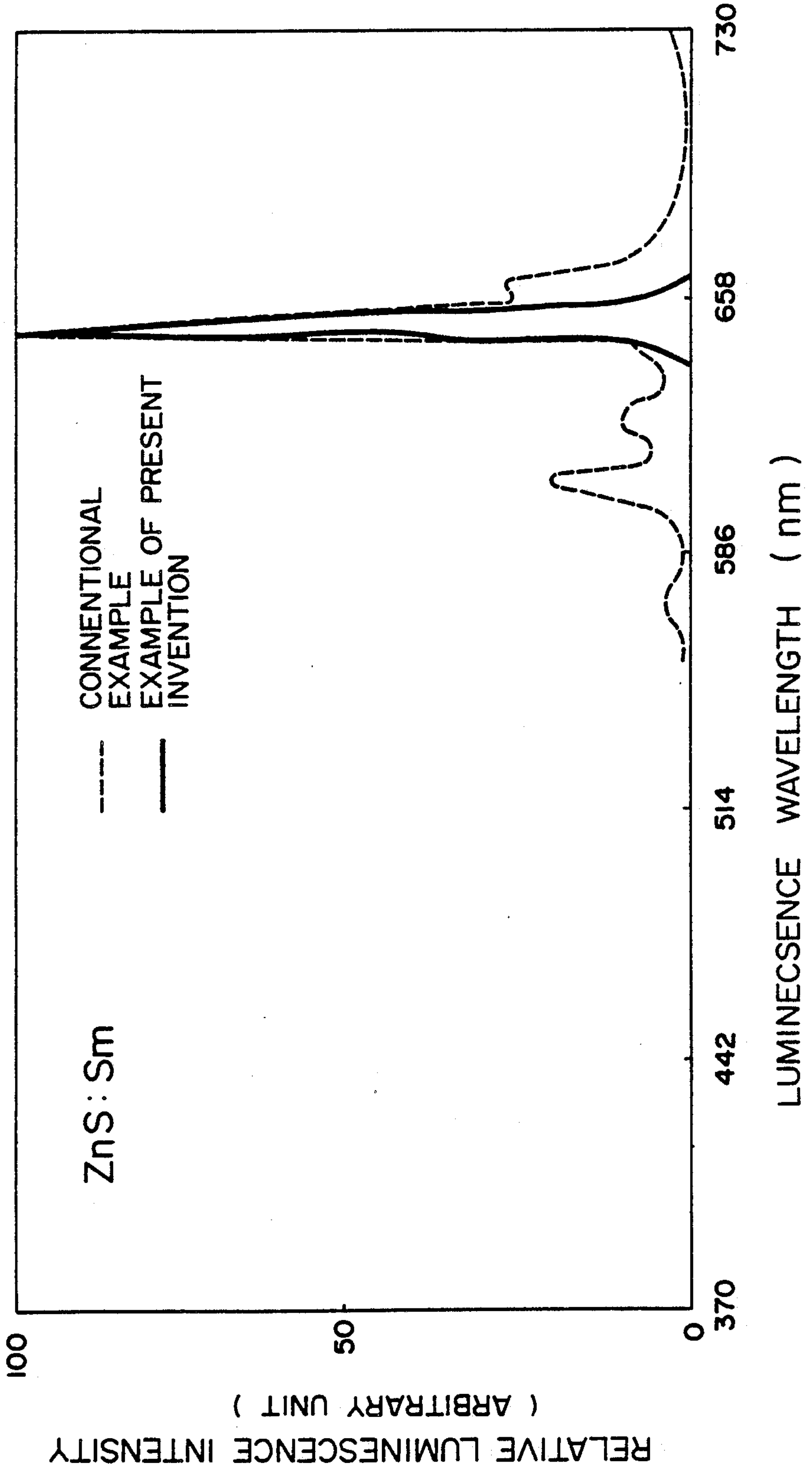
Figure 15:
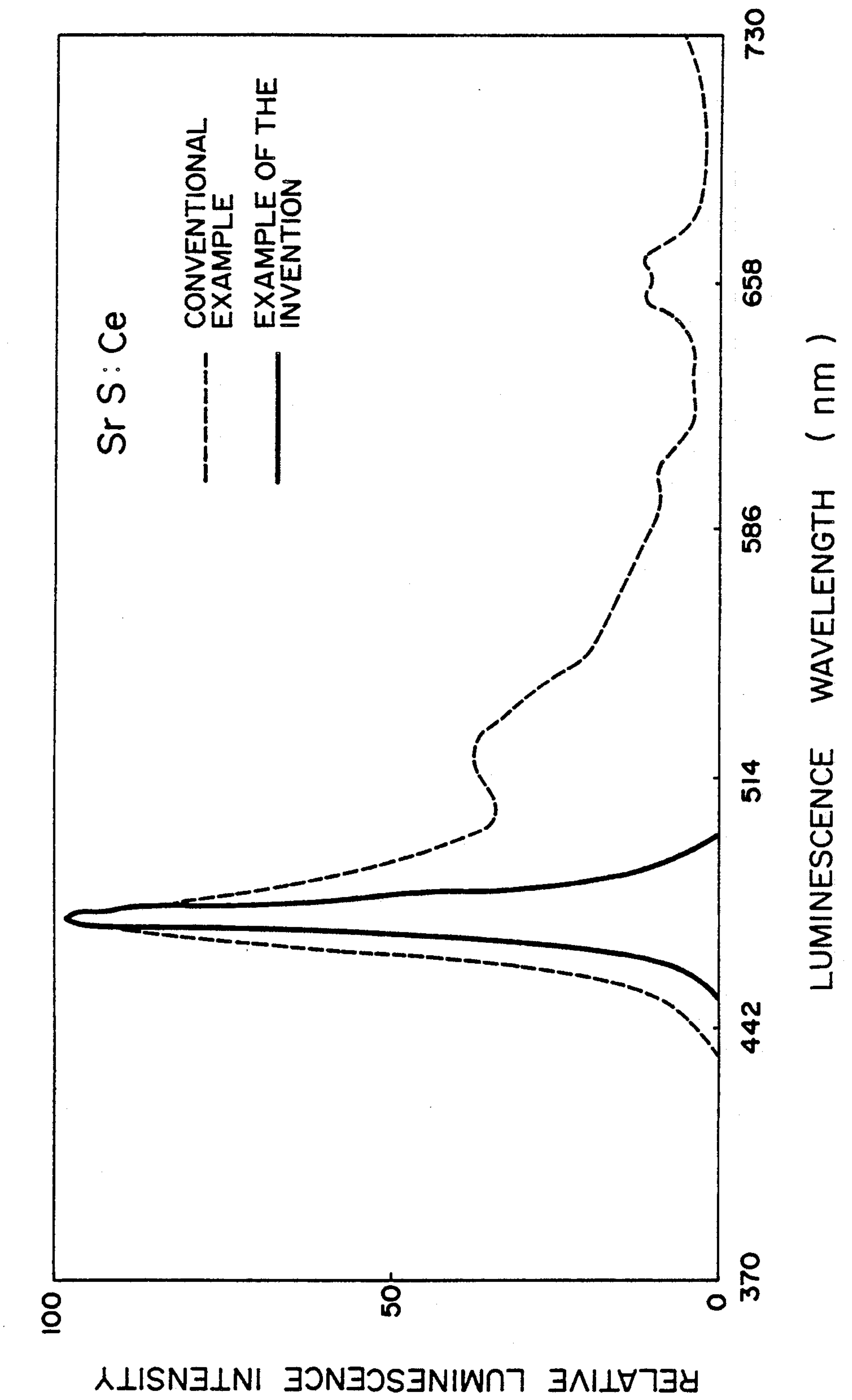

FIGS. *2a* and *2b* are diagrams of a Fabry-Perot interferometer;

FIGS. *3a* and *3b* are diagrams of the principle of a function of the Fabry-Perot interferometer;

FIG. 4 is a diagram of a multilayer-film optical interference filter;

FIG. 5 is a diagram of a basic characteristic of the multilayer-film optical interference filter;

FIG. 6 is a cross-sectional view of the basic construction of a thin-film EL apparatus which represents an embodiment of the present invention;

FIG. 7 is a diagram of luminance-voltage characteristics of the thin-film EL apparatus in accordance with the embodiment;

FIGS. 8 to 12 are cross-sectional views of the basic constructions of thin-film EL apparatus which represent other embodiments of the present invention;

FIGS. 13 to 15 are diagrams of spectra of light emitted by the thin-film EL apparatus which represent the embodiments of the present invention; and FIGS. 16 to 20 are cross-sectional views of the basic constructions of thin-film EL apparatus which represent further embodiments of the present invention.

DESCRIPTION OF THE PREFERRED EMBODIMENTS

Explanation will be made of preferred embodiments of the present invention with reference to the drawings.

Embodiment 1

FIG. 6 shows in section a basic construction of a thin-film EL apparatus in accordance with the present invention.

A transparent ITO electrode 2 is formed on a glass substrate 1, a reflecting mirror layer 3 is formed on the electrode 2, and a first dielectric layer 4 having a dielectric constant $\epsilon 1$ and a thickness d1 is formed on the reflecting mirror layer 3. A fluorescent material layer 5 having a thickness d3 is formed on the dielectric layer 4, and a second dielectric layer 6 having a dielectric constant $\epsilon 2$ and a thickness d2 is successively superposed. Back electrodes 7 having the function of a reflecting mirror layer as well as the function of an electrode layer are formed on the second dielectric layer 6. A thin-film EL apparatus having this structure was manufactured, and the refractive index n of the lamination of the first dielectric layer, the fluorescent material layer and the second dielectric layer with respect to the wavelength of light emitted from the fluorescent material layer was measured with an ellipsometer.

The total thickness d of this lamination is expressed by $$d = d1 + d2 + d3. \quad (1)$$

Each factor is determined so that the following relationship is established among the fluorescent material layer emission wavelength λ, the refractive index n and the total thickness d:

$$d = K \cdot n^{-1} \lambda / 2 \quad (2)$$

where K is a positive integer equal to or larger than 1.

It was confirmed that the thin-film EL apparatus in accordance with the first embodiment of the present invention shown in FIG. 6 had a voltage-luminance characteristic such as that shown in FIG. 7(*a*), and that the luminance from the fluorescent material layer could be efficiently extracted through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films and perovskite-type oxide dielectric films represented by a strontium titanate film were used for the first and second dielectric films. Table 1 shows the characteristics of the dielectric films used for the present invention.

TABLE 1

| Constituent material | Dielectric breakdown field strength | Dielectric constant | n* |
|---|---|---|---|
| $SiO_2$ | 6~10 | 3.9 | ~1.4 |
| $Al_2O_3$ | 2~8 | 8.5 | ~1.5 |
| $Ta_2O_5$ | 0.5~4 | 25 | ~2.3 |
| $HfO_2$ | 0.2~4 | 16 | ~2.2 |
| $Y_2O_3$ | 0.5~4 | 10~14 | ~2.0 |
| Si—O—N | 5~8 | 4 | ~1.5 |
| $Si_3N_4$ | 7 | 6.8 | ~2.0 |
| $PbTiO_3$ | 0.5 | 30~200 | ~2.5 |
| a-$BaTiO_3$** | 3~5 | 10~40 | ~2.2 |
| $SrTiO_3$ | 0.5~3 | 20~16 | ~2.5 |
| Ba(Sn, Ti)$O_3$ | 1~6 | 20~16 | ~2.5 |
| Sr(Zr, Ti)$O_3$ | 1~6 | 20~16 | ~2.5 |
| $BaTa_2O_6$ | 3~5 | 22 | ~2.3 |
| $PbNbO_6$ | 1.5 | 40~60 | ~2.4 |

n* represents the refractive index in the vicinity of a visible region (~550 nm).
**indicates amorphous barium titanate.

The combination of the dielectric layers and the fluorescent material layer and the total thickness d of the lamination structure of this embodiment were determined by the equation (2) from values, such as those shown in Table 2, of the emission wavelength λ and the refractive index n of the lamination structure of the dielectric layers and the fluorescent material layer determine by the ellipsometer with respect to the emission wavelength.

TABLE 2

Values of total thickness d when K = 1

(unit: mm)

| Refractive index | Emission wavelength (nm) 440 | 460 | 480 | 500 | 520 | 540 | 560 | 580 | 600 | 620 | 640 | 660 | 680 |
|---|---|---|---|---|---|---|---|---|---|---|---|---|---|
| 1.0 | 220 | 230 | 240 | 250 | 260 | 270 | 280 | 290 | 300 | 310 | 320 | 330 | 340 |
| 1.2 | 264 | 276 | 288 | 300 | 312 | 324 | 336 | 348 | 360 | 372 | 384 | 396 | 408 |
| 1.4 | 308 | 322 | 336 | 350 | 364 | 378 | 392 | 406 | 420 | 434 | 448 | 462 | 476 |
| 1.6 | 352 | 368 | 384 | 400 | 416 | 432 | 448 | 464 | 480 | 496 | 512 | 528 | 544 |
| 1.8 | 396 | 414 | 432 | 450 | 468 | 486 | 504 | 522 | 540 | 558 | 576 | 594 | 612 |
| 2.0 | 440 | 460 | 480 | 500 | 520 | 540 | 560 | 580 | 600 | 620 | 640 | 660 | 680 |
| 2.2 | 484 | 506 | 528 | 550 | 572 | 594 | 616 | 638 | 660 | 682 | 704 | 726 | 748 |
| 2.4 | 528 | 552 | 576 | 600 | 624 | 648 | 672 | 696 | 720 | 744 | 768 | 792 | 816 |
| 2.6 | 572 | 598 | 624 | 650 | 676 | 702 | 728 | 754 | 780 | 806 | 832 | 858 | 884 |
| 2.8 | 616 | 644 | 672 | 700 | 728 | 756 | 784 | 812 | 840 | 868 | 896 | 924 | 952 |
| 3.0 | 660 | 690 | 720 | 750 | 780 | 810 | 840 | 870 | 900 | 930 | 960 | 990 | 1020 |

In a case where the refractive index had an intermediate value not shown in Table 2, it was calculated by using the equation (2).

It was confirmed that the present invention enabled manufacture of a thin-film EL apparatus capable of emitting light with a desired emission wavelength at a high efficiency.

It was demonstrated that a thin-film EL apparatus manufactured by using ZnS: Tb, F, ZnS: Sm, or SrS: Ce for the fluorescent material layer was capable of emitting light with a spectrum reduced in half width as compared with the conventional EL apparatus having no reflecting mirror layer with emission efficiency which is 5 to 15 times higher than attained by the same conventional EL apparatus.

The increase in the emission efficiency was remarkably large when the reflectivities of the reflecting mirror layers were 0.7 or higher. The reflectivity of one of the two reflecting mirror layers which is located on the luminescence extraction side was set to be smaller than that of the other. Incidentally, there are two luminescence extraction surfaces, one on the glass substrate side and the other on the back electrode side. On the glass substrate side, light emitted from the fluorescent material layer passes through the glass substrate after passing through the reflecting mirror, and a part of the light is absorbed or does not go out of the glass substrate into the outside air layer owing to the difference between the refractive indexes of the glass substrate and the air layer. On the back electrode side, light is directly emitted to the air layer and the emission luminance is therefore higher.

Embodiment 2

A second embodiment of the present invention will be described below with reference to the accompanying drawings.

Figure 8:
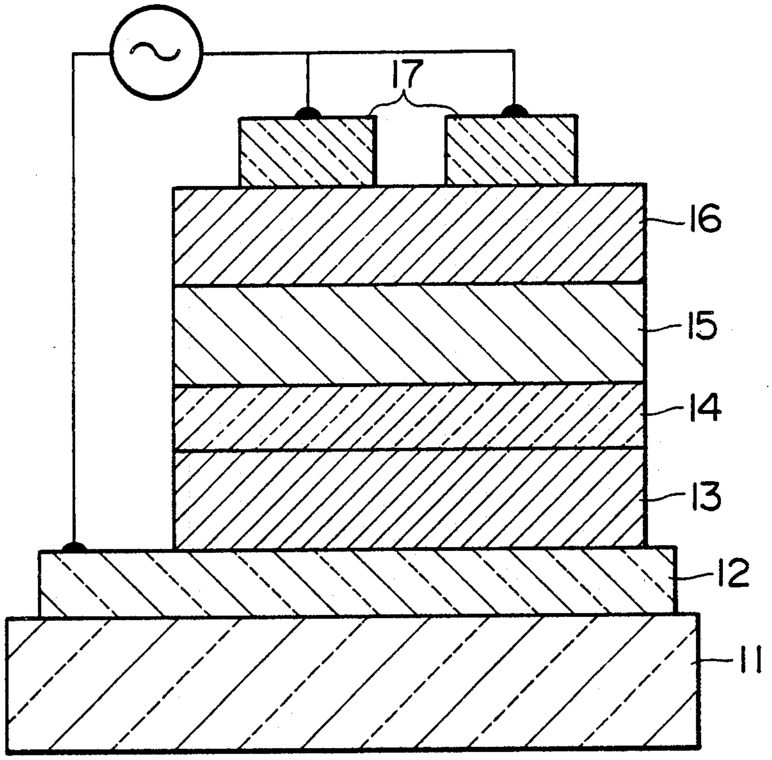

FIG. 8 shows in section a basic construction of a thin-film EL apparatus in accordance with the second embodiment of the present invention.

A transparent ITO electrode 12 is formed on a glass substrate 11, a first dielectric layer 13 having a dielectric constant $\epsilon 1$ and a thickness d1 is formed on the electrode 12, and a reflecting mirror layer 14 is formed on the first dielectric layer 13. A fluorescent material layer 15 having a thickness d3 is formed on the reflecting mirror layer 14, and a second dielectric layer 16 having a dielectric constant $\epsilon 2$ and a thickness d2 is successively superposed. Back electrodes 17 having the function of a reflecting mirror layer as well as the function of an electrode layer are formed on the second dielectric layer 16. A thin-film EL apparatus having this structure was manufactured and the refractive index n of the lamination of the fluorescent material layer and the second dielectric layer with respect to the wavelength of light emitted from the fluorescent material layer was measured with an ellipsometer.

The total thickness d of this lamination is expressed by $$d = d2 + d3. \quad (3)$$

Each factor is determined so that the following relationship is established among the fluorescent material layer emission wavelength λ, the refractive index n and the total thickness d:

$$d = K \cdot n^{-1} 19\ \lambda/2 \quad (4)$$

where K is a positive integer equal to or larger than 1.

It was confirmed that this thin-film EL apparatus had a voltage-luminance characteristic similar to that of the first embodiment, and that the luminance from the fluorescent material layer could be efficiently extracted through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films. The characteristics of the dielectric films used for the invention are shown in Table 1.

The combination of the dielectric layers and the fluorescent material layer and the total thickness d of this embodiment were determined by the equation (4) from values, such as those shown in Table 2, of the lamination structure of the dielectric layers and the fluorescent material layer determined by the ellipsometer with respect to the emission wavelength.

It was confirmed that the present invention enabled manufacture of a thin-film EL apparatus capable of emitting light with a desired emission wavelength at a high efficiency. It was demonstrated that a thin-film EL apparatus manufactured by using ZnS: Tb, F, ZnS: Sm, or SrS: Ce for the fluorescent material layer was capable of emitting light with a spectrum reduced in half width as compared with the conventional EL apparatus having no reflecting mirror layer with an emission efficiency which is 5 to 15 times higher than that attained by the same conventional EL apparatus. The increase in the emission efficiency was markedly large when the reflectivities of the reflecting mirror layers were 0.7 or higher. The reflectivity of one of the two reflecting mirror layers located on the luminescence extraction side was set to be smaller than that of the other. In the arrangement of this embodiment, the luminance was higher when the light was extracted on the back electrode side.

Embodiment 3

Figure 9:
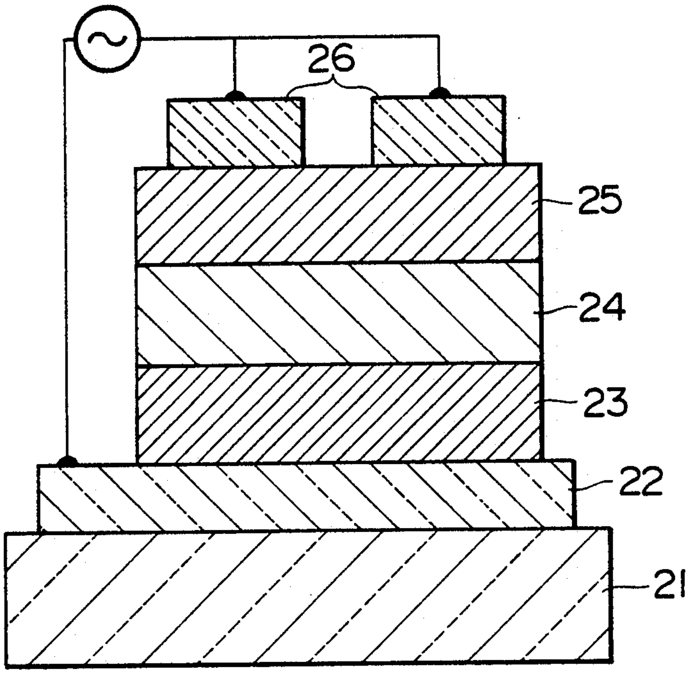

A third embodiment of the present invention will be described below with reference to the accompanying drawings FIG. 9 shows in section a basic construction of a thin-film EL apparatus in accordance with the third embodiment of the present invention.

A metallic electrode 22 having the function of a reflecting mirror layer as well as the function of an electrode layer is formed on a glass substrate 21, and a first dielectric layer 23 having a dielectric constant $\epsilon 1$ and a thickness d1 is formed on the electrode 22. A fluorescent material layer 24 having a thickness d3 is formed on the first dielectric layer 23, and a second dielectric layer 25 having a dielectric constant $\epsilon 2$ and a thickness d2 is successively superposed. Back electrodes 26 having the function of a reflecting mirror layer as well as the function of an electrode layer are formed on the second dielectric layer 25. A thin-film EL apparatus having this structure was manufactured and the refractive index n of the lamination of the first dielectric layer, the fluorescent material layer and the second dielectric layer with respect to the wavelength of light emitted from the fluorescent material layer was measured with an ellipsometer.

The total thickness d of this lamination is expressed by $$d = d1 + d2 + d3. \quad (5)$$

Each factor is determined so that the following relationship is establish among the fluorescent material layer emission wavelength λ, the refractive index n and the total thickness d:

$$d = K \cdot n^{-1} \lambda/2 \quad (6)$$

where K is a positive integer equal to or larger than 1.

It was confirmed that the thin-film EL apparatus of this embodiment had a voltage-luminance characteristic similar to those of the above-described embodiment, and that the luminance from the fluorescent material layer could be efficiently extracted through the luminescence surface.

The fluorescent material layer was formed by using a fluorescent material selected from the group consisting of AnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films. The characteristics of the dielectric films used for the invention are shown in Table 1.

The combination of the dielectric layers and the fluorescent material layer and the total thickness d of the lamination structure of this embodiment were determined by the equation (6) from values, such as those shown in Table 2, of the emission wavelength λ and the refractive index n of the lamination structure of the dielectric layers and the fluorescent material layer determined by the ellipsometer with respect to the emission wavelength.

It was confirmed that the present invention enabled manufacture of a thin-film EL apparatus capable of emitting light with a desired emission wavelength at a high efficiency. It was demonstrated that a thin-film EL apparatus manufactured by using ZnS: Tb, F, ZnS: Sm, or SrS: Ce for the fluorescent material layer was capable of emitting light with a spectrum reduced in half width as compared with the conventional EL apparatus having no reflecting mirror layer with an emission efficiency which is 5 to 15 times higher than that attained by the same conventional EL apparatus. The increase in the emission efficiency was remarkably large when the reflectivities of the reflecting mirror layers were 0.7 or higher. The reflectivity of one of the two reflecting mirror layers located on the luminescence extraction side was set to be smaller than that of the other. In the arrangement of this embodiment, the luminance was higher when the light was extracted on the back electrode side.

Embodiment 4

A fourth embodiment of the present invention will be described below with reference to the accompanying drawings.

Figure 10:
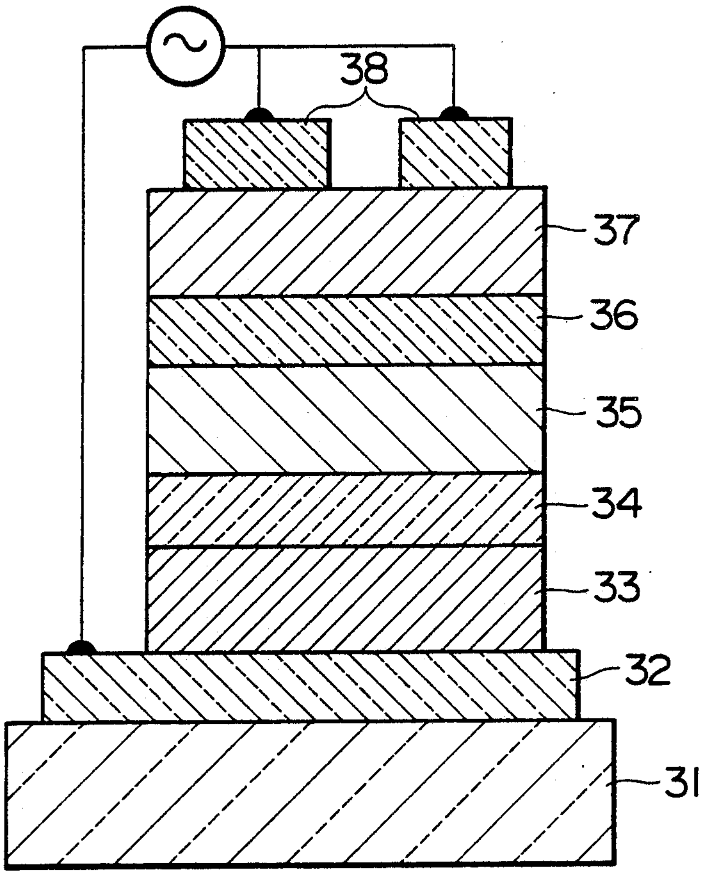

FIG. 10 shows in section a basic construction of a thin-film EL apparatus in accordance with the fourth embodiment of the present invention.

A transparent ITO electrode 32 is formed on a glass substrate 31, a first dielectric layer 33 having a dielectric constant $\epsilon 1$ and a thickness d1 is formed on the electrode 32, and a reflecting mirror layer 34 is formed on the first dielectric layer 33. A fluorescent material layer 35 having a thickness d3 is formed on the first dielectric layer 34, and another reflecting mirror layer 36 and a second dielectric layer 37 having a dielectric constant $\epsilon 2$ and a thickness d2 are successively superposed on the fluorescent material layer 35. Back electrodes 38 are formed on the second dielectric layer 37. A thin-film EL apparatus having this structure was manufactured and the refractive index n of the fluorescent material layer interposed between the reflecting mirrors with respect to the wavelength of light emitted from the fluorescent material layer was measured with an ellipsometer.

Each factor is determined so that the following relationship is established among the fluorescent material layer emission wavelength λ, the refractive index n and the thickness d3:

$$d3 = K \cdot n^{-1} \lambda / 2 \tag{7}$$

where K is a positive integer equal to or larger than 1.

It was confirmed that the thin-film EL apparatus of this embodiment also had a voltage-luminance characteristic similar to that of the first embodiment, and that the luminance from the fluorescent material layer could be efficiently extracted through the luminescence surface.

The fluorescent material layer was formed by using a fluorescent material selected from the group consisting of AnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films.

The thickness d3 of the fluorescent material layer of this embodiment was determined on the basis of the equation (7) from values of the emission wavelength λ and the refractive index n of the lamination structure of the dielectric layers and the fluorescent material layer determined by the ellipsometer with respect to the emission wavelength.

It was confirmed that the present invention enabled manufacture of a thin-film EL apparatus capable of emitting light with a desired emission wavelength at a high efficiency. It was demonstrated that a thin-film EL apparatus manufactured by using ZnS: Tb, F, ZnS: Sm, or SrS: Ce for the fluorescent material layer was capable of emitting light with a spectrum reduced in half width as compared with the conventional EL apparatus having no reflecting mirror layer with an emission efficiency which is 5 to 15 times higher than that attained by the same conventional EL apparatus. The increase in the emission efficiency was remarkably large when the reflectivities of the reflecting mirror layers were 0.7 or higher. The reflectivity of one of the two reflecting mirror layers located on the luminescence extraction side was set to be smaller than that of the other. In the arrangement of this embodiment, the luminance was higher when the light was extracted on the electrode side.

Embodiment 5

A fifth embodiment of the present invention will be described below with reference to the accompanying drawings.

Figure 11:
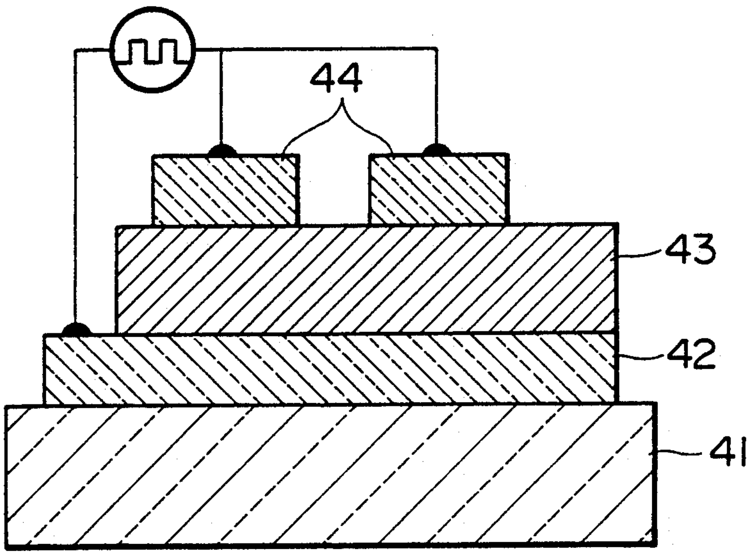

FIG. 11 shows in section a basic construction of a thin-film EL apparatus in accordance with the fifth embodiment of the present invention.

A reflecting mirror layer 42 having the function of an electrode also is formed on a glass substrate 41. A fluorescent material layer 43 having a thickness d3 is formed on the reflecting mirror layer 42, and a back electrodes 45 serving as another reflecting mirror layer 44 are formed on the fluorescent material layer 43. A thin-film EL apparatus having this structure was manufactured and the refractive index n of the fluorescent material layer interposed between the reflecting mirrors with respect to the wavelength of light emitted from the fluorescent material layer was measured with an ellipsometer.

Each factor is determined so that the following relationship is established among the fluorescent material layer emission wavelength λ, the refractive index n and the thickness d3:

$$d3 = K \cdot n^{-1} \lambda / 2 \quad (7)$$

where K is a positive integer equal to or larger than 1.

It was confirmed that the thin-film EL apparatus of this embodiment shown in FIG. 11 had a voltage-luminance characteristic such that the luminance from the fluorescent material layer could be efficiently extracted through the luminescence surface as in the case of the above-described embodiments.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. A dispersion type powder EL apparatus was also used.

The thickness d3 of the fluorescent material layer of this embodiment was determined on the basis of the equation (7) from values of the emission wavelength I and the refractive index n determined by the ellipsometer with respect to the emission wavelength.

It was confirmed that the present invention enabled manufacture of a thin-film EL apparatus capable or emitting light with a desired emission wavelength at a high efficiency.

The increase in the emission efficiency was remarkably large when the reflectivities of the reflecting mirror layers were 0.7 or higher. The reflectivity of one of the two reflecting mirror layers located on the luminescence extraction side was set to be smaller than that of the other. In the arrangement of this embodiment, the luminance was higher when the light was extracted on the side of the back electrodes.

Next, a thin-film EL display in which a multilayer-film interferometer is used as a reflecting mirror layer will be described below.

Embodiment 6

A sixth embodiment of the present invention will be described below with reference to the accompanying drawings.

Figure 12:
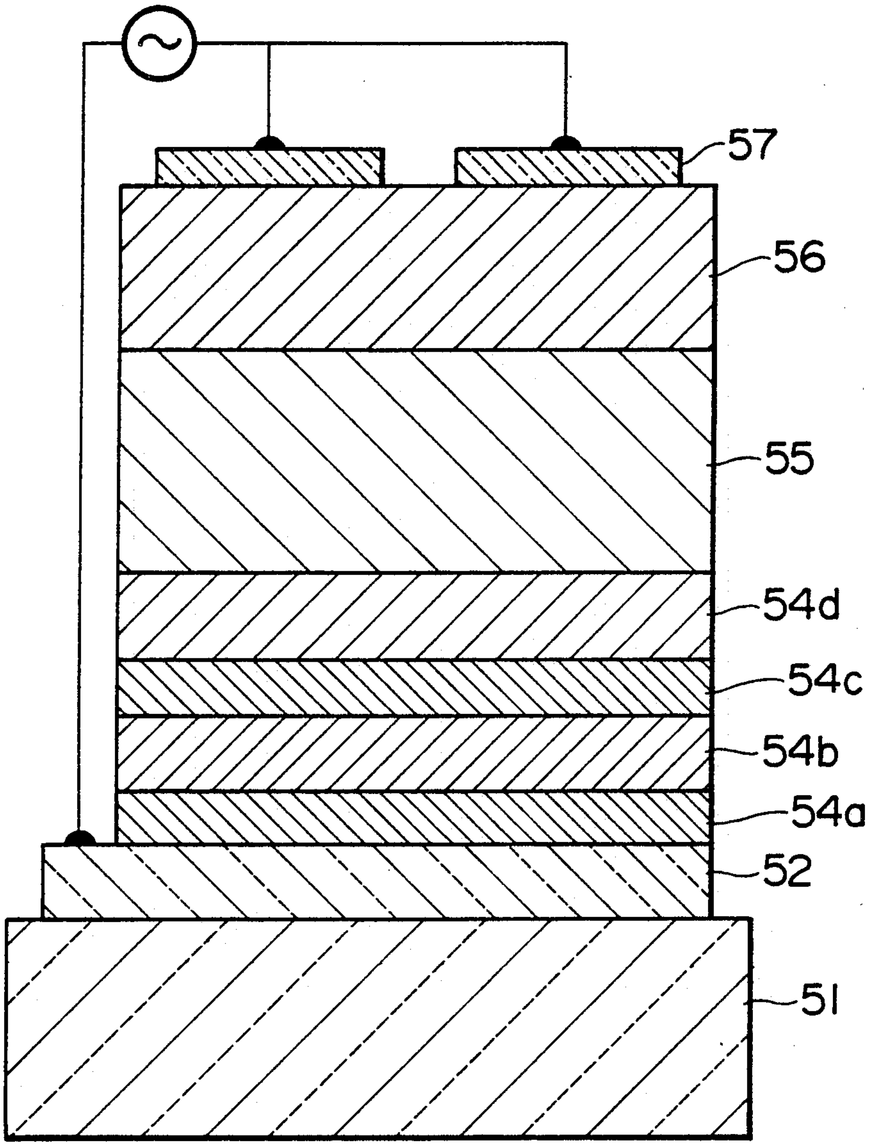

FIG. 12 shows in section a basic construction of a thin-film EL apparatus in accordance with the sixth embodiment of the present invention.

A transparent electrode 52 is formed on a glass substrate 51, and a first dielectric layer (a) 54*a* having a refractive index n1 of about 2.4 with respect to the emission wavelength and having a dielectric constant ε1 and a thickness d1 is formed on the electrode 52. An optical thin film having a refractive index n2 of about 1.5 and a thickness d2 (e.g., film of $MgF_2$ (n1=1.38) or $SiO_2$ (n1=1.52)) is formed as a first dielectric layer (b) 54*b* on the first dielectric layer (a) 54*a*. Another dielectric thin film identical with the first dielectric layer (a) is successively superposed as a first dielectric layer (c) 54*c*, and a first dielectric layer (d) 54*d* having the refractive index n2 and the thickness d2 is successively superposed. A fluorescent material layer 55 having refractive index n3 of about 2.4 and a thickness d3 is formed on the dielectric layer (d) 54*d*, and a dielectric thin film having a refractive index n4 of about 2.4±0.2 close to n3 and having a thickness d4 is formed as a second dielectric layer 56 is formed on the fluorescent material layer 55. Back electrodes 57 having the function of a reflecting mirror layer as well as the function of an electrode layer are formed on the second dielectric layer 56. A thin-film EL apparatus having this structure was manufactured and the refractive indexes n1, n2, n3, and n4 of the first dielectric layers (a) to (d), the fluorescent material layer and the second dielectric layer with respect to an emission wavelength 10 were measured with an ellipsometer. The thicknesses d1, d2, and d4 of the dielectric layers and the thickness d3 of the fluorescent material layer were determined so as to satisfy the following equations based on the multilayer-film optical interference filter design method:

$$ni \cdot di = \lambda 0/4 \quad (8)$$

$$(i = 1, 2)$$

$$n3 \cdot d3 = \lambda 0/2 \cdot N \quad (9)$$

$$n4 \cdot d4 = \lambda 0/2 \cdot N \quad (10)$$

($N$: positive number (1, 2, 3 . . . ))

That is, an EL device having the function of electroluminescence as well as the function of an optical interference multilayer-film filter was formed.

It was confirmed that the thin-film EL apparatus of this embodiment shown in FIG. 12 had a voltage-luminance characteristic such as that shown in FIG. 7(*b*), and that the luminance from the fluorescent material layer could be efficiently extracted through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission light with a main emission wavelength of 650 nm, and SrS: Ce or ZnS: Tm which emits blue light with a wavelength of about 480 nm. The materials of the first dielectric films (a) to (d) and the second dielectric film were selected from yttrium oxide, tantalum oxide, aluminum oxide, siliconooxide, silicon nitride and perovskite-type oxide dielectric materials represented by strontium titanate, barium tantalate and the like in consideration of the refractive index with respect to the emission wavelength.

The thickness of each of the dielectric layers and the fluorescent material layer of this embodiment was determined by using the equations (1), (2), and (3) and values of the emission wavelength λ0 and the refractive index n of the dielectric layers and the fluorescent material layer determined by the ellipsometer and by measurement of optical transmittance with respect to the wavelength of light emitted from the fluorescent material layer.

It was confirmed that the present invention enabled manufacture of a thin-film EL apparatus capable of emitting light with a desired emission wavelength with a high efficiency.

The increase in the emission efficiency was greater as the half width with respect to the selected emission wavelength was reduced. The reflectivity of the reflecting mirror layer formed of the optical interference multilayer-film filter where the luminescence was extracted was set to be smaller than that of the reflectivity of the back electrodes.

FIGS. 13, 14, and 15 show spectra of a thin-film EL apparatus manufactured by using ZnS: Tb, F, ZnS: Sm, and SrS: Ce for the fluorescent material layer. It was demonstrated that the present invention enabled manufacture of a thin-film EL apparatus capable of emitting light of a desired wavelength with an efficiency which is 5 to 80 times higher than that attained by the conventional thin-film EL apparatus having no multi-layer-film optical interference filter and no reflecting mirror layer, and also capable of selecting desired luminescence colors that is, capable of emitting three elementary colors, green, red and blue. These effects were improved as the value of K was reduced, and the increase in emission efficiency was remarkably large when the half width with respect to the selected emission wavelength was reduced. The reflectivities of the two reflecting mirror layers, i.e., those of the optical interference filter and the metallic electrodes were selected in such a manner that the reflectivity of the optical interference filter on the luminescence extraction side was smaller. The construction in which an optical interference filter is used to constitute one of the two reflecting mirror layers ensures a reduction in the half width with respect to the emission wavelength as well as an increase in the optical amplification as compared with the case where the two reflecting mirror layers are single-layer films formed of metallic thin films or the like.

Next, a multilayer-film optical interference filter capable of effecting electroluminescence will be described below.

Embodiment 7

A seventh embodiment of the present invention will be described below with reference to the accompanying drawings.

Figure 16:
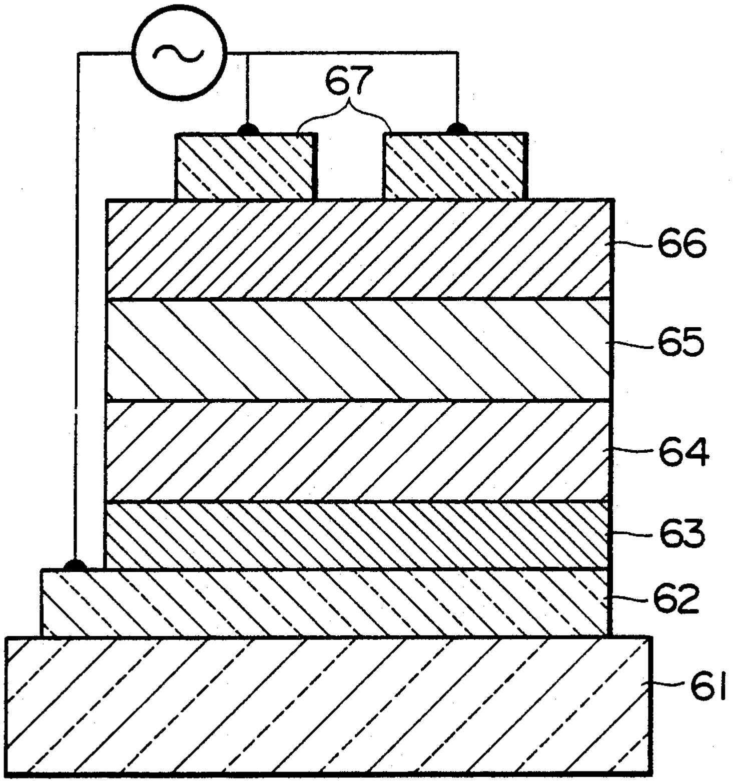

FIG. 16 shows in section a basic construction of a thin-film EL apparatus in accordance with the seventh embodiment of the present invention.

A transparent ITO electrode 62 is formed on a glass substrate 61, a multilayer-film optical interference filter layer 63 is formed on the electrode 62, and a first dielectric layer 64 having a dielectric constant $\epsilon 1$ and a thickness d1 is formed on the filter layer 63. A fluorescent material layer 65 having a thickness d3 is formed on the dielectric layer 64, and a second dielectric layer 66 having a dielectric constant $\epsilon 2$ and a thickness d2 is successively superposed. Back electrodes 67 having the function of a reflecting mirror layer as well as the function of an electrode layer are formed on the second dielectric layer 66. A thin-film EL apparatus having this structure was manufactured and the refractive index n of the lamination of the first dielectric layer, the fluorescent material layer and the second dielectric layer with respect to the wavelength of light emitted from the fluorescent material layer was measured with an ellipsometer.

The total thickness d of this lamination is expressed by $$d = d1 + d2 + d3. \tag{11}$$

Each factor is determined so that the following relationship is established between the fluorescent material layer emission wavelength λ, the refractive index n and the total thickness d:

$$d = K \cdot n^{-1} \lambda / 2 \tag{12}$$

where K is a positive integer equal to or larger than 1.

It was confirmed that the thin-film EL apparatus of this embodiment shown in FIG. 16 had a voltage-luminance characteristic such as that shown in FIG. 7(*b*), and that the luminance from the fluorescent material layer could be efficiently extracted through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films. The characteristics of the dielectric films used for the invention are shown in Table 1.

The combination of the dielectric layers and the fluorescent material layer and the total thickness d of the lamination structure of this embodiment were determined by the equation (2) from values, such as those shown in Table 2, of the emission wavelength λ and the refractive index n of the lamination structure of the dielectric layers and the fluorescent material layer determined by the ellipsometer with respect to the emission wavelength.

It was confirmed that the present invention enabled manufacture of a thin-film EL apparatus capable of emitting light with a desired emission wavelength at a high efficiency.

It was demonstrated that the present invention enabled manufacture of a thin-film EL apparatus capable of emitting light of a desired wavelength with an efficiency which is 5 to 80 times higher than that attained by the conventional thin-film EL apparatus having no multilayer-film optical interference filter and no reflecting mirror layer, and also capable of selecting luminescence colors, that is capable of emitting the three elementary colors, green, red and blue. These effects were improved as the value of K was reduced, and the increase in the emission efficiency was remarkably large when the half width with respect to the selected emission wavelength was reduced. The reflectivities of the two reflecting mirror layers, i.e., those of the optical interference filter and the metallic electrodes were selected in such a manner that the reflectivity of the optical interference filter on the luminescence extraction side was smaller. In the arrangement of this embodiment, the luminance was higher when the light is extracted on the side of the back electrode side.

Embodiment 8

An eighth embodiment of the present invention will be described below with reference to the accompanying drawings.

Figure 17:
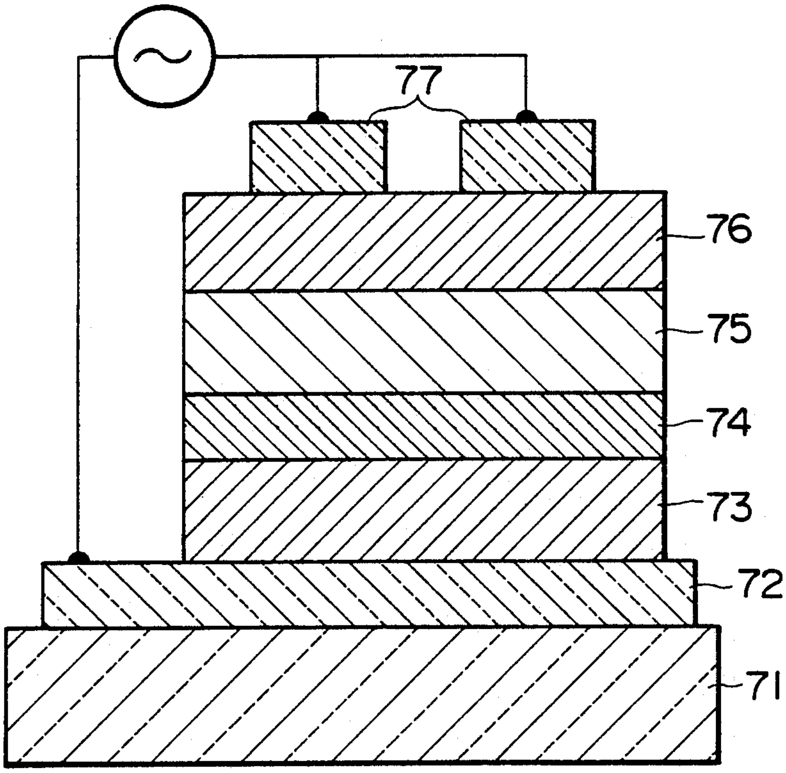

FIG. 17 shows in section a basic construction of a thin-film EL apparatus in accordance with the eighth embodiment of the present invention.

A transparent ITO electrode 72 is formed on a glass substrate 71, a first dielectric layer 73 having a dielectric constant $\epsilon 1$ and a thickness d1 is formed on the electrode 72, and a multilayer-film optical interference filter layer 74 having the function of a reflecting mirror layer also is formed on the first dielectric layer 73. A fluorescent material layer 75 having a thickness d3 is formed on the filter layer 74, and a second dielectric layer 76 having a dielectric constant $\epsilon 2$ and a thickness d2 is successively superposed. Back electrodes 77 having the function of a reflecting mirror layer as well as the function of an electrode layer are formed on the second dielectric layer 76. A thin-film EL apparatus having this structure was manufactured and the refractive index n of the lamination of the fluorescent material layer and the second dielectric layer with respect to the wavelength of light emitted from the fluorescent material layer was measured with an ellipsometer.

The total thickness d of this lamination is expressed by $$d=d2+d3 \qquad (13)$$

Each factor is determined so that the following relationship is established among the fluorescent material layer emission wavelength λ, the refractive index n and the total thickness d:

$$d=K \cdot n^{-1} \cdot \lambda/2 \qquad (14)$$

where K is a positive integer equal to or larger than 1.

It was confirmed that the thin-film EL apparatus of this embodiment shown in FIG. 17 had a voltage-luminance characteristic such as that shown in FIG. 7(*b*), and that the luminance from the fluorescent material layer could be efficiently extracted through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films. The characteristics of the dielectric films used for the invention are shown in Table 1.

The combination of the dielectric layers and the fluorescent material layer and the total thickness d of the lamination structure of this embodiment were determined by the equation (14) from values, such as those shown in Table 2, of the emission wavelength λ and the refractive index n of the lamination structure of the dielectric layers and the fluorescent material layer determined by the ellipsometer with respect to the emission wavelength.

It was confirmed that the present invention enabled manufacture of a thin-film EL apparatus capable of emitting light with a desired emission wavelength at a high efficiency. It was demonstrated that the thin-film EL apparatus manufactured by using ZnS: Tb, F, ZnS: Sm, and SrS: Ce for the fluorescent material layer was capable of emitting light with a spectrum reduced in half width as compared with the conventional thin-film EL apparatus having no optical interference filter and no reflecting mirror layer with an efficiency which is 5 to 80 times higher than that attained by the same conventional EL apparatus, and also capable of selecting desired luminescence color that is capable of emitting the three elementary colors, green, red and blue as desired. The increase in the emission efficiency was remarkably large when the half width with respect to the selected emission wavelength was reduced. The reflectivities of the two reflecting mirror layers including that of the optical interference filter were set in such a manner that the reflectivity on the luminescence extraction side was lower. In the arrangement of this embodiment, the luminance was higher when the light is extracted on the back electrode side.

Embodiment 9

A ninth embodiment of the present invention will be described below with reference to the accompanying drawings.

Figure 18:
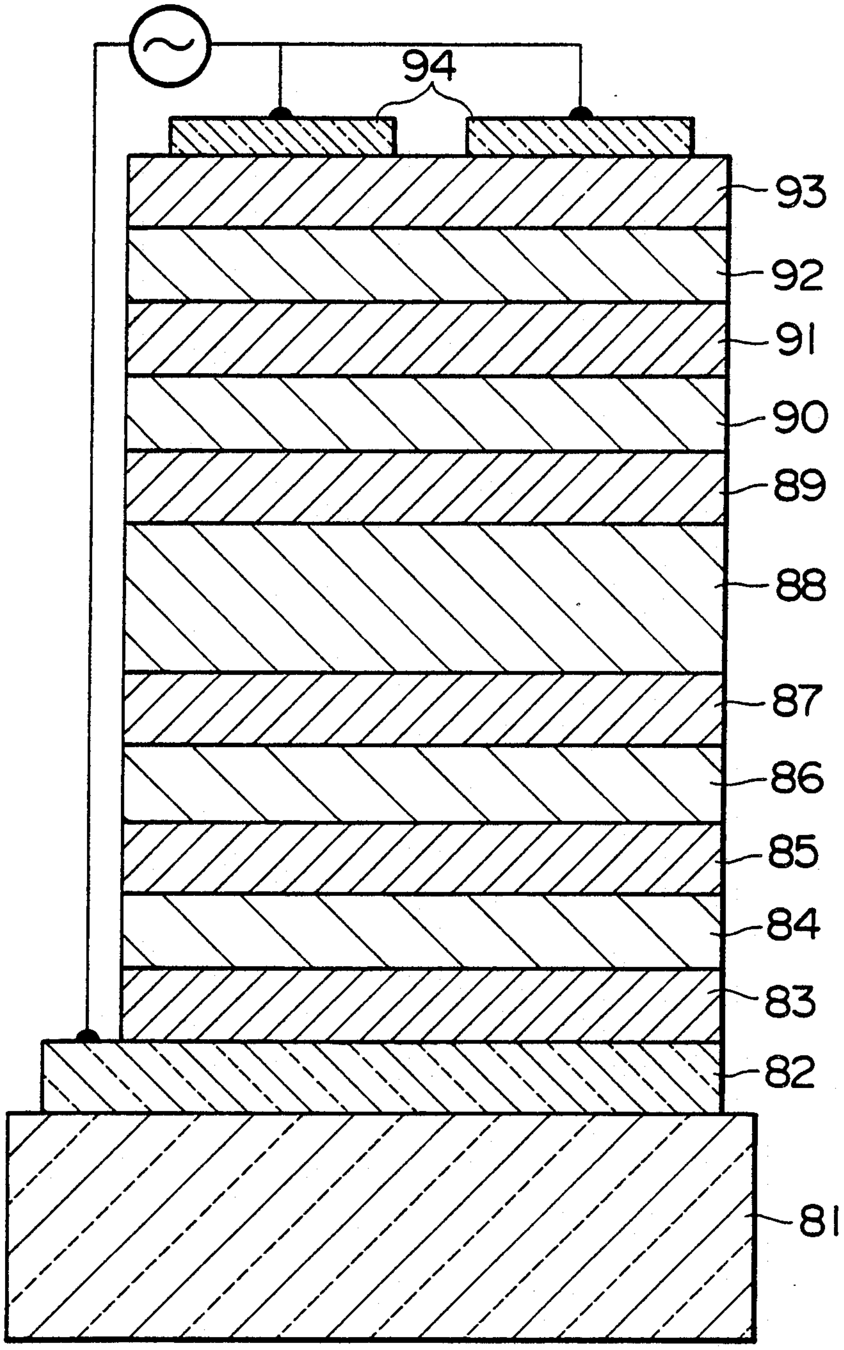

FIG. 18 shows in section a basic construction of a thin-film EL apparatus in accordance with the ninth embodiment of the present invention.

A transparent electrode 82 is formed on a glass substrate 81, and an optical thin film having a refractive index n1 of about 1.5 with respect to the emission wavelength and having a dielectric constant $\epsilon 1$ and a thickness d1 (e.g., film of $MgF_2$ (n1=1.38) or $SiO_2$ (n1=1.52)) is formed as a first dielectric layer 83 on the electrode 82. A fluorescent material layer 84 having a refractive index n3 of about 2.4 and a thickness d3 is formed on the first dielectric layer 83, and another dielectric thin film equal to the first dielectric layer is successively superposed as a second dielectric layer 85. Another fluorescent material layer 86 also having the refractive index n3 of about 2.4 and the thickness d3 is formed on the second dielectric layer 85, still another dielectric thin film identical with the first dielectric layer is successively superposed as a third dielectric layer 87 on the fluorescent material layer 86, and still another fluorescent material layer 88 having the refractive index n3 of about 2.4 and a thickness d4 (twice as large as d3) is formed on the third dielectric layer 87. Similarly, on the fluorescent material layer 88 are successively formed a fourth dielectric layer 89 which is the same dielectric thin film as the first dielectric layer, a fluorescent material layer 90 having the refractive index n3 of about 2.4 and the thickness d3, a fifth dielectric layer 91 which is the same dielectric thin film as the first dielectric layer, a fluorescent material layer 92 having the refractive index n3 of about 2.4 and the thickness d3, and a sixth dielectric layer 93 which is the same dielectric thin film as the first dielectric layer. Back electrodes 94 having the function of a reflecting mirror layer as well as the function of an electrode layer are formed on the sixth dielectric layer 93. A thin-film EL apparatus having this structure was manufactured and the refractive indexes n1 and n3 of the first dielectric layer, the fluorescent material layer and the second dielectric layer with respect to an emission wavelength λ0 were measured with an ellipsometer. The thicknesses d1 of the first and second dielectric layers and the thickness d3 of the fluorescent material layers were determined so as to satisfy the following equation based on the multilayer-film optical interference filter design method:

$$n1 \cdot d1 = n3 \cdot d3 = \lambda 0/4$$

That is, an EL device having the function of electroluminescence as well as the function of an optical interference multilayer-film filter was formed.

It was confirmed that the thin-film EL apparatus of this embodiment shown in FIG. 18 had a voltage-luminance characteristic such that light of the emission wavelength λ0 could be efficiently extracted from the fluorescent material layer through the luminescence surface.

The fluorescent material layer was formed by using a fluorescent material selected from the group consisting of ZnS: Mn which emits orange light with a main emission wavelength of 580 nm, ZnS: Tb, F or ZnS: Tb, P which emits green light with a main emission wavelength of 544 nm, CaS: Eu or ZnS: Sm which emits red light with a main emission wavelength of 650 nm, and SrS: Ce or ZnS: Tm which emits blue light with a wavelength of about 480 nm. Yttrium oxide films, tantalum oxide films, aluminum oxide films, silicon oxide films, silicon nitride films or perovskite-type oxide dielectric films represented by a strontium titanate film were used for the first and second dielectric films. The characteristics of the dielectric films used for the invention are shown in Table 1.

Embodiment 10

A tenth embodiment of the present invention will be described below with reference to the accompanying drawings.

Figure 19:
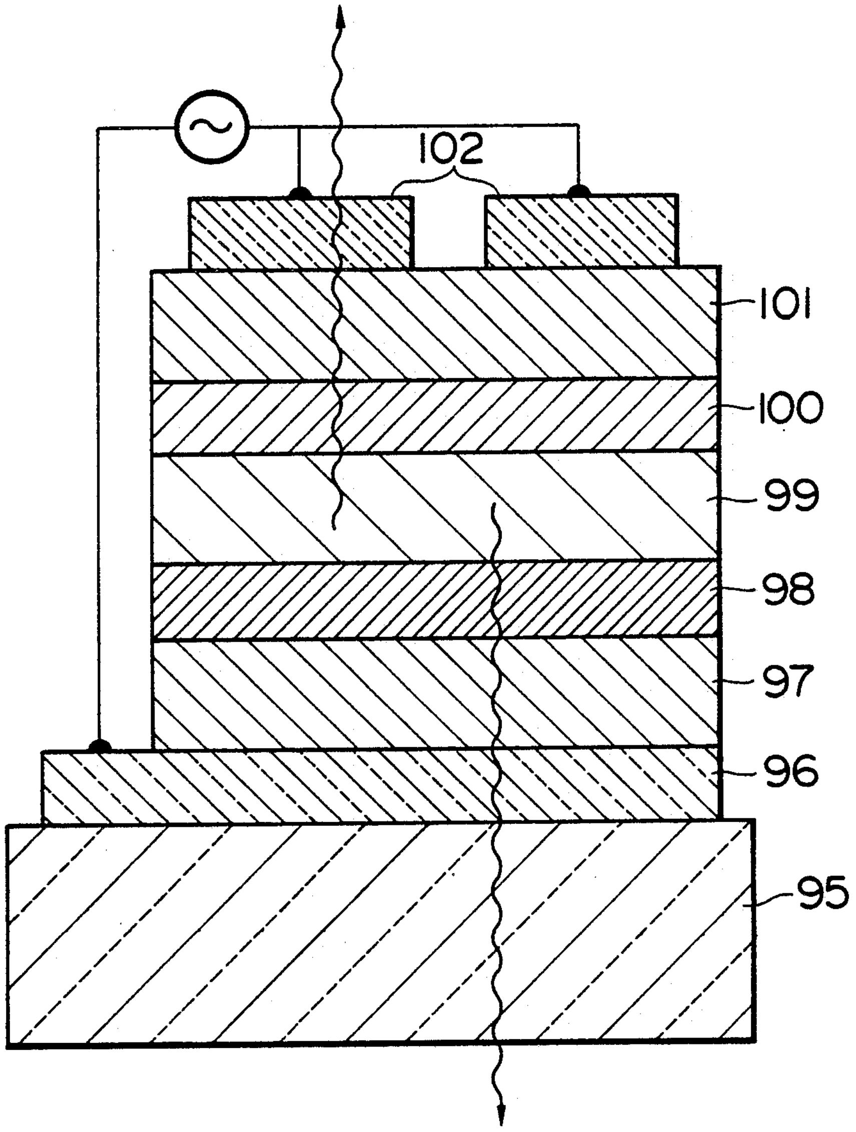

FIG. 19 shows in section a basic construction of a thin-film EL apparatus in accordance with the tenth embodiment of the present invention.

A transparent ITO electrode 96 is formed on a glass substrate 95, a multilayer-film optical interference filter layer 97 for allowing transmission of light having wavelengths centered at a desired emission wavelength λ1 is formed on the electrode 96, and a first dielectric layer 98 having a dielectric constant ε1 and a thickness d1 is formed on the filter layer 97. Next, a fluorescent material layer 99 having a thickness d3 is formed on the first dielectric layer 98, and a second dielectric layer 100 having a dielectric constant ε2 and a thickness d2 is successively superposed. On the second dielectric layer 100 are successively formed a multilayer film optical interference filter layer 101 for allowing transmission of light having wavelengths centered at a desired emission wavelength λ2 (different from λ1) and transparent electrodes 102. A thin-film EL apparatus having this structure was manufactured and the refractive index n of the lamination of the first dielectric layer, the fluorescent material layer and the second dielectric layer with respect to the wavelength of light emitted from the fluorescent material layer were measured with an ellipsometer.

The total thickness d of this lamination is expressed by $$d = d1 + d2 + d3. \quad (15)$$

Each factor is determined so that the following relationship is established among the fluorescent material layer emission wavelength λ, the refractive index n and the total thickness d:

$$d = K \cdot n^{-1} \cdot \lambda/2 \quad (16)$$

where K is a positive integer equal to or larger than 1.

It was confirmed that the thin-film EL apparatus in accordance with the tenth embodiment of the present invention shown in FIG. 19 had a voltage-luminance characteristic such that the luminance could be efficiently extracted from the fluorescent material layer through the luminescence surface. This effect is considered to be explained by the fact that the multilayer film optical interference filters serve as reflecting mirror layers and that the lamination of the first and second dielectric layers and the fluorescent material layer constitutes a Fabry-Perot interferometer.

The fluorescent material layer was formed by using a fluorescent material selected from the group consisting of ZnS: Mn which has a refractive index of about 2.4 and which emits orange light with a main emission wavelength of 580 nm, and SrS: Ce, K, Eu, ZnS: $PrF_3$ or SrS: Pr, F which emits white light. Yttrium oxide films, tantalum oxide films, aluminum oxide films, silicon oxide films, silicon nitride films or perovskite-type oxide dielectric films represented by a strontium titanate film were used for the first and second dielectric films.

Embodiment 11

An eleventh embodiment of the present invention will be described below with reference to the accompanying drawings.

Figure 20:
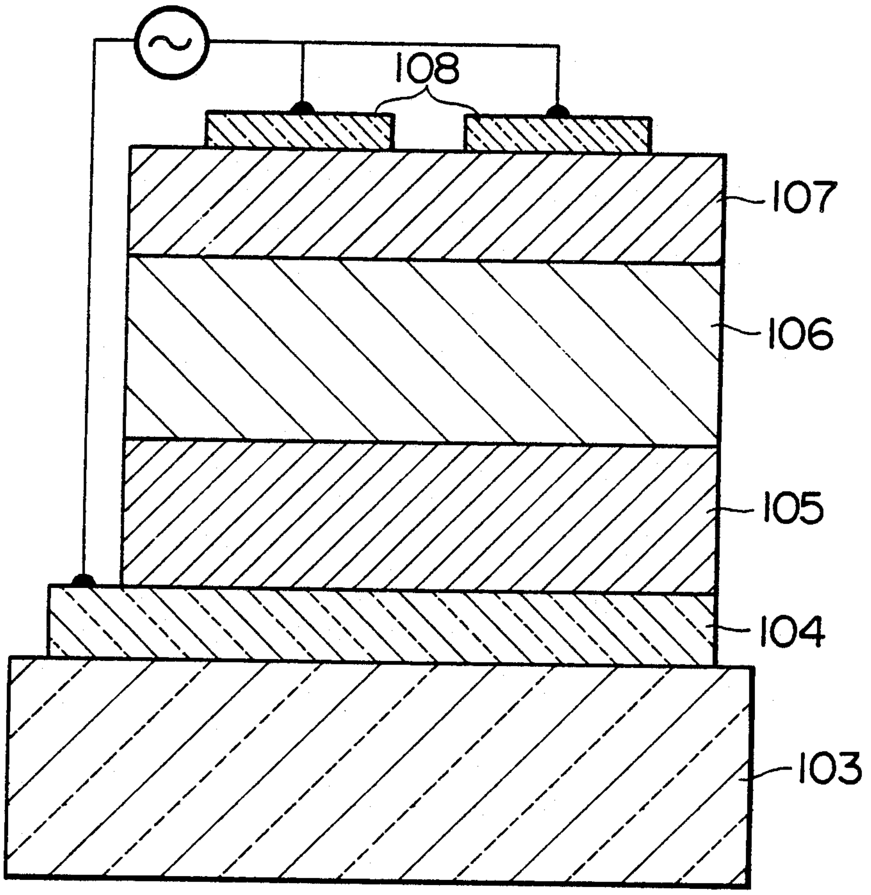

FIG. 20 shows in section a basic construction of the thin-film EL apparatus in accordance with the eleventh embodiment of the present invention.

A transparent ITO electrode 104 is formed on a glass substrate 103, and a multilayer film optical interference filter layer 105 for allowing transmission of light having wavelengths centered at a desired emission wavelength of about λ1 is formed on the electrode 104. Next, a fluorescent material layer 106 having a thickness dA is formed on the filter layer 105 and, a dielectric layer 107 having a dielectric constant ε2 and a thickness d2 is successively superposed, and back electrodes 108 serving as a reflecting mirror layer also are formed on the dielectric layer 107. A thin-film EL apparatus having this structure was manufactured and the refractive index n of each of the thin film constituting the multilayer-film optical interference filter layer 105, the fluorescent material layer 106 and the dielectric layer 107 with respect to the desired emission wavelength was measured with an ellipsometer.

The thickness d of each thin film is determined so that the following relationship is established between the desired emission wavelength λ1 and the refractive index:

$$d = K \cdot n^{-1} 19\ \lambda/2 \quad (17)$$

for the fluorescent material layer 106 where K is a positive integer equal to or larger than 1; and $$d = n^{-1} \cdot \lambda/4 \quad (18)$$

$$d = n^{-1} \cdot \lambda/4 \cdot K \quad (19)$$

for the thin film constituting the multilayer-film optical interference filer 105, and the dielectric layer 107.

The structure of the thin film constituting the multilayer-film optical interference filter layer 105 is based on the combination of a thin film material L having a refractive index comparatively small i.e., about 1.5 with respect to the desired emission wavelength λ1 and a thin film material H having a refractive index comparatively large, i.e., 2.0 or larger with respect to λ1. For example, these materials are laminated on the transparent electrode 104 in the order of L,H,L,L,H,L, H,L,H,H,L,H,L, or H,L,H,H,L,H,L,H,L,L,H.L. With respect to visible light emission wavelengths, the material L is, for example, quartz ($SiO_2$:n=1.35−1.5), $MgF_2$: n=1.38 or aluminum oxide ($Al_2O_3$:n=1.54), and the material H is, for example, titanium oxide (Ti-O: n=2.55), tantalum oxide (Ta-O: n=2.25), barium tantalate ($BaTa_2O_6$: n=2.25) or a perovskite-type oxide ($SrTiO_3$: n=2.38, $BaTiO_3$: n=2.4). There are compounds suitable for the material H in composite perovskite type oxides and composite tungsten bronze oxides. Needless to say, a plurality of combinations of the materials L and H are possible.

It was confirmed that the thin-film EL apparatus in accordance with the first aspect of the present invention had a voltage-luminance characteristic such as that shown in FIG. 7(*b*) and such that the luminance could be efficiently extracted from the fluorescent material layer through the luminescence surface. This effect is considered to be explained by the fact that the multilayer film optical interference filter serves as a reflecting mirror layer and that the lamination of the second dielectric layer and the fluorescent material layer constitutes a Fabry-Perot interferometer.

The fluorescent material layer was formed by using a fluorescent material selected from the group consisting of ZnS: Mn which has a refractive index of about 2.4 and which emits orange light with a main emission wavelength of 580 nm, and SrS: Ce, K, Eu, ZnS: $PrF_3$ or SrS: Pr, F which emits white light. It is necessary to select a material for the second dielectric layer according to the refractive index of the fluorescent material. A simplex or complex dielectric film formed of a material selected from the group consisting of yttrium oxide, tantalum oxide, tungsten bronze type oxides represented by barium tantalate and perovskite-type oxide dielectric materials represented by strontium titanate was actually used.

In accordance with the present invention, thin film EL apparatus capable of emitting light of the desired wavelengths at an improved efficiency are manufactured, thereby realizing full-color flat displays used as OA system terminals, TV image display units, view finder units and so on.

As many apparently widely different embodiments of this invention may be made without departing from the spirit and scope thereof; it is to be understood that the invention is not limited to the specific embodiments thereof except as defined in the appended claims.

What is claimed is:

1. A thin-film electroluminescence apparatus comprising: a pair of electrode layers at least one of which is light-transmissible; a fluorescent material layer or a laminated structure of a fluorescent material layer and a dielectric material layer, a voltage being applied to said fluorescent material layer or said laminated structure through said pair of electrode layers; and reflecting mirror layers provided on two sides of said fluorescent material layers or said laminated structure of fluorescent and dielectric material layers, said reflecting mirror layers having a reflectivity equal to or larger than 0.7 and smaller than 1 with respect to a wavelength λ of light emitted from said fluorescent material layer; wherein the following relationship is established between the refractive index n of said fluorescent material layer or said laminated structure of fluorescent and dielectric material layers;

$$d=K\cdot n^{-1}\cdot\lambda/2$$

where K is a positive integer equal to or larger than 1 and where d is the total thickness of said fluorescent material layer or said laminated structure.

2. A thin-film electroluminescence apparatus according to claim 1, wherein said electrode layer has a reflectivity which is substantially the same as that of said reflecting mirror layers.

3. A thin-film electroluminescence apparatus including an optical interference filter, comprising: a light-transmissible electrode layer; a light reflecting electrode layer; a fluorescent material layer or a laminated structure of a fluorescent material layer and a dielectric material layer, a voltage being applied to said fluorescent material layer or said laminated structure through said electrode layers; and a multilayer-film optical interference filter means for selectively transmitting light emitted from said fluorescent material layer and having an arbitrary wavelength λ, said optical interference filter means being provided on a light extraction side of said fluorescent material layer or said laminated structure of fluorescent and dielectric material layers, said optical interference filter means being formed of at least one first dielectric film having a smaller refractive index and at least one second dielectric film having a larger refractive index, said first and second dielectric films being alternately laminated based on an equation λ/4=film thickness x refractive index in the order of said second dielectric film and said first dielectric film, said fluorescent material layer having a refractive index larger than that of said first dielectric film based on an equation λ/2·N=film thickness x refractive index (where N is an integer equal to or larger than 1), and further successively laminating a third dielectric film based on an equation λ/4 x positive integer being laminated=film thickness x refractive index.

4. A thin-film electroluminescence apparatus according to claim 3, wherein an oxide having a refractive index of 2 or larger in a visible region and including a perovskite-type oxide or tantalum and an oxide or nitride having a refractive index larger than 1 and smaller than 2 are used for said dielectric material layers.

5. A thin-film electroluminescence apparatus comprising: a pair of electrode layers at least one of which is light-transmissible; a fluorescent material layer or a laminated structure of a fluorescent material layer and a dielectric material layer, a voltage being applied to said fluorescent material layer or said laminated structure through said pair of electrode layers; and a multilayer-film optical interference filter means for selectively transmitting light emitted from said fluorescent material layer and having an arbitrary wavelength, said optical interference means being provided on a light extraction side of said fluorescent material layer or said laminated structure of fluorescent and dielectric material layers.

6. A thin-film electroluminescence apparatus comprising: a pair of electrode layers at least one of which is light-transmissible; and a fluorescent material layer or a laminated structure of a fluorescent material layer and a dielectric material layer, a voltage being applied to said fluorescent material layer or said laminated structure through said pair of electrode layers, said fluorescent material layer and said laminated structure of fluorescent and dielectric material layers constituting a multilayer-film optical interference filter means for selectively transmitting light emitted from said fluorescent material layer and having an arbitrary wavelength.

7. A thin-film electroluminescence apparatus comprising: a pair of light-transmissible electrode layers; a fluorescent material layer or a laminated structure of a fluorescent material layer and a dielectric material layer, a voltage being applied to said fluorescent material layer or said laminated structure through said pair of electrode layers; and two types of multilayer-film optical interference filters provided on two light extraction sides of said fluorescent material layer or said laminated structure of fluorescent and dielectric material layers, said multilayer-film optical interference filters allowing transmission of light of different wavelengths emitted from said fluorescent material layer.

* * * * *